United States Patent [19]

Sakamoto et al.

[11] Patent Number: 5,098,949
[45] Date of Patent: Mar. 24, 1992

[54] ELECTRODEPOSITABLE AQUEOUS COATING COMPOSITION WITH A COMPONENT HAVING CYCLIC UREA GROUPS

[75] Inventors: Hiroyuki Sakamoto, Nishinomiya; Kenshiro Tobinaga, Kawanishi; Noriyuki Tsuboniwa, Higashiosaka; Satoshi Urano, Tsuzuki; Yasuyuki Tsuchiya, Hirakata; Hirotoshi Umemoto, Uji, all of Japan

[73] Assignee: Nippon Paint Co., Ltd., Osaka, Japan

[21] Appl. No.: 456,795

[22] Filed: Dec. 29, 1989

[30] Foreign Application Priority Data

Dec. 29, 1988 [JP] Japan ............................. 63-331998

[51] Int. Cl.$^5$ ............................................. C08L 75/12
[52] U.S. Cl. ................................ 524/560; 524/571; 524/591; 524/604; 524/611; 524/612; 524/901
[58] Field of Search ............... 524/560, 571, 579, 591, 524/604, 611, 612, 901

[56] References Cited

U.S. PATENT DOCUMENTS

| | | | |
|---|---|---|---|
| 3,686,204 | 8/1972 | Munz et al. | 548/320 |
| 3,862,074 | 1/1975 | Hickey et al. | 524/507 |
| 4,126,595 | 11/1978 | Martorano et al. | 524/560 |
| 4,151,142 | 4/1979 | Herman et al. | 524/535 |
| 4,410,689 | 10/1983 | Barsa et al. | 528/367 |
| 4,855,394 | 8/1989 | Goeckel et al. | 528/263 |

OTHER PUBLICATIONS

Chilley, James N. et al., "J. Org. Chem.", 29(11), 3347-50 (1964).

*Primary Examiner*—Maurice J. Welsh
*Assistant Examiner*—Rachel Johnson
*Attorney, Agent, or Firm*—Wegner, Cantor, Mueller & Player

[57] ABSTRACT

Disclosed is a novel curing system which is not associated with decomposition or production of low molecular materials. The curing system employs an aqueous composition which comprises (a) a compound having in one molecule at least two carbonylcyclic urea groups represented by the following formula (1)

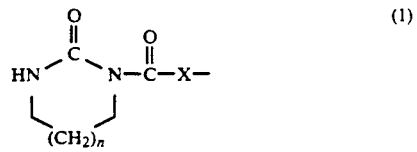

[wherein n is an integer of 0 to 5, X which may be the same or different and represents oxygen atom, a sulfur atom or $-NR_1-$ in which $R_1$ is a hydrogen atom, an alkyl, hydroxyalkyl or alkylene group having 1 to 5 carbon atoms.] and (b) a basic resin which has a functional group reactive with an isocyanate group and is water soluble or water dispersible by neutralizing. The present invention also provides an aqueous composition comprising a basic resin (c) which has a functional group reactive with an isocyanate group and has in one molecule at least two carbonylcyclic urea groups represented by the following formula (1)

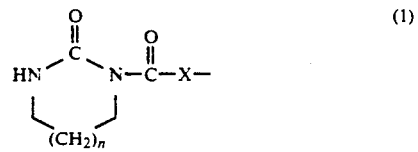

wherein n and X are the same as mentioned above, and which is water soluble or water dispersible by neutralizing.

7 Claims, No Drawings

ELECTRODEPOSITABLE AQUEOUS COATING COMPOSITION WITH A COMPONENT HAVING CYCLIC UREA GROUPS

FIELD OF THE INVENTION

The present invention relates to an aqueous coating composition which is especially suitable for electrocoating.

BACKGROUND OF THE INVENTION

Electrocoating technique, especially cationic electrocoating technique, has been drastically progressed with the development of a blocked polyisocyanate curing agent (see Japanese Kokoku Publication (examined) 34238/1980). The blocked polyisocyanate is a compound of which a reactive isocyanate group is blocked with a blocking agent (such as a low molecular weight alcohol). This compound is unblocked at an elevated temperature to produce the isocyanate groups which contribute crosslinking reactions.

The blocked polyisocyanate curing agent has drawbacks in heating loss and distortion of coating. These drawbacks are caused by the low molecular weight blocking agents which produce after unblocking.

Japanese Kokoku Publication 24007/1988 discloses the use of a cyclic urea derivative curing agent which produces isocyanate groups by decomposition upon heating. The curing agent, however, has problems similar to the isocyanate curing agent, because it is decomposed to produce a low molecular weight material.

SUMMARY OF THE INVENTION

The present inventors have found a novel curing system which is not associated with decomposition or production of low molecular materials. Accordingly, the present invention provides an aqueous coating composition which comprises (a) a compound having in one molecule at least two carbonylcyclic urea groups represented by the following formula (1)

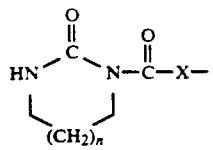

(1)

[wherein n is an integer of 0 to 5, X which may be the same or different and represents an oxygen atom, a sulfur atom or $-NR_1-$ in which $R_1$ is a hydrogen atom, an alkyl, hydroxyalkyl or alkylene group having 1 to 5 carbon atoms] and (b) a basic resin which has a functional group reactive with an isocyanate group and is water soluble or water dispersible by way of neutralizing.

The present invention also provides an aqueous composition which comprises a basic resin (c) which has a functional group reactive with an isocyanate group and has in one molecule at least two carbonylcyclic urea groups represented by the following formula (1)

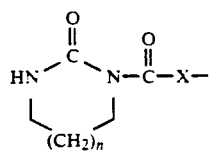

(1)

[wherein n and X are the same as mentioned above] and which is water soluble or water dispersible by way of neutralizing.

DETAILED DESCRIPTION OF THE INVENTION

The compound (a) of the present invention can be any compound having at least two, preferably 3 to 50 carbonylcyclic urea groups in one molecule. It is difficult to represent the compound (a) chemical formula, but it may be represented by the following formula

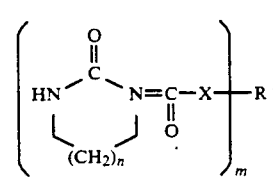

(2)

[wherein n is an integer of 0 to 5, m is an integer of at least 2, preferably 3 to 50, X which may be the same or different represents oxygen, sulfur or $-NR_1$ ($R_1$ represents hydrogen or an alkyl group having 1 to 5 carbon atoms) and R represents a difunctional organic residue having a molecular weight of up to 100,000, preferably 42 to 20,000. The carbonylcyclic urea groups (1) in the compound (a) may be the same or different. In the formula (2), concrete examples of R are an alkyl, cycloalkyl, aryl, aralkyl, alkaryl or glycidyl group having 1 to 50 carbon atoms; an alkyl, cycloalkyl, aryl, aralkyl or alkaryl group with 1 to 50 carbon atoms which contains one or more

O, S or N and has a molecular weight of 15 to 600; or said group which is substituted by a glycidyl group, a hydroxyl group, a nitro group, a halogen atom, a cyano group, a formyl group or an amino group. Also, R can be a polymeric compound residue having a molecular weight of more than 600, such as a polyester residue, a polyether residue, a polybutadiene residue, a polyacrylic residue, a polyepoxy residue or the like.

The compound (a) may be prepared by reacting a compound represented by the following formula (3)

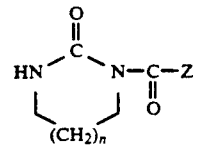

(3)

[wherein Z is a halogen atom, an alkoxy or aryloxy group having 1 to 10 carbon atoms and n is the same as mentioned above] with a compound having the following formula (4)

$$R+X-H)_m \quad (4)$$

wherein m, R and X are the same as mentioned above. The compound (3) may be prepared according to the following reaction formula

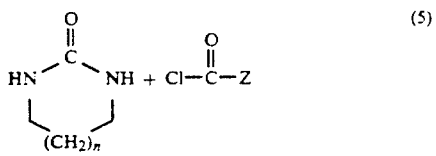

(5)

In the above reaction formula, the left of the starting materials is a cyclic urea, and the right is phosgene or a reaction product of phosgene with a suitable alcohol.

The component (b) of the present invention is a resin which has both a group crosslinkable with an isocyanate group and a water soluble or water dispersible ionic group. The group which is crosslinkable with an isocyanate group is an active hydrogen-containing group, such as a primary or secondary amino group, a hydroxyl group, a thiol group or a carboxyl group. The ionic group includes a cationic group, such as a primary, secondary or tertiary amino group, a quaternatry ammonium group, a tertiary thionium group or a phosphonium group; or an anionic group, such as a carboxyl group, a sulfonic group or a phosphonic group. The ionic group may be present in the resin (b) in an amount of 30 to 300 mmol/100 g (solid). Amounts of less than 30 mmol/100 g are poor in water solubility or water dispersibility, and amounts of more than 300 mmol/100 g deteriorate coating properties, such as corrosion resistance. Neutralizing can be effected with a neutralizing agent. The neutralizing agent includes acid for the cationic group, such as formic acid, acetic acid, lactic acid, sulfonic acid or phosphonic acid; or base for the anionic group, such as a primary, secondary or tertiary amine, ammonia or sodium hydroxide. The backbone of the component (b) can be any polymer backbone, such as epoxy, polybutadiene, polybutene, polyacryl, polyurethane, polyester, polyamide and the like. A method for introducing the above mentioned group into the polymer backbone is generally known to the art, and is not explained herein.

Another embodiment of the present invention is a one component system which employs a basic resin having not only a functional group reactive with an isocyanate group but also has at least two carbonylcyclic urea groups (1) in one molecule (hereinafter "resin (c)"). The resin (c) is concretely a resin (b) into which the cyclic urea group (1) is introduced. The introduction of the cyclic urea group is known, but generally a method wherein a polymer having a —(X—H) group (e.g. 2-hydroxyethyl acrylate or 2-hydroxyethyl methacrylate) is reacted with the above mentioned compound (3); or a method wherein a compound having both a polymerizable group and a —(X—H) group is copolymerized with other monomers. Amounts of the ionic group are the same as the two component system.

The aqueous coating composition, particularly electrocoating composition of the present invention is prepared by mixing the components (a) and (b), or the component (c) with water, preferably deionized water. The composition may contain an organic solvent in a small amount if necessary. Examples of the organic solvents are ethyleneglycol monomethyl ether, ethyleneglycol monoethyl ether, ethyleneglycol monobutyl ether, methanol, ethanol, isopropyl alcohol, n-butyl alcohol, sec-butyl alcohol, t-butyl alcohol, methyl ethyl ketone, methyl i-butyl ketone, cyclohexanone, isophorone, dioxane, toluene, xylene, ethylacetate, propylacetate, butylacetate, amylacetate, dimethylformamide and the like.

In the two component system, the amount of the component (a) is within the range of 0.5 to 70% by weight, preferably 5 to 50% by weight, based on the total weight of the components (a) and (b).

The aqueous coating composition of the present invention may further contain other additives, such as pigment, surfactant, curing accelerator, defoaming agent, curing catalyst and the like. The additives may be present in an amount of 10 to 50% by weight based on the total solid content. Examples of the pigments are color pigments, such as carbon black, titanium oxide, iron oxide, cyanine blue and Cinquacia red; extender pigments, such as calcium carbonate, aluminum silicate and barium sulfate; and corrosion resistant pigments, such as strontium chromate, basic lead silicate and the like. Examples of the curing catalysts are organic metal salts, such as tin or lead containing organic salts; organic metal esters, such as tin containing organic metal esters; and tertiary amines, such as triethylamine, dimethylbenzylamine, diazobicyclo undecene and the like. The aqueous coating composition of the present invention can be cured without curing catalyst. Especially in case where an amino group-containing resin is formulated, since the amino groups would fulfill curing catalystic function, curing is conducted without curing catalyst.

The aqueous coating composition of the present invention may be coated by any conventional methods, such as dipping, flow coating, spray coating and the like, but electrocoating is most preferred. Electrocoating can be carried out under art-known conditions, but generally conducted at a temperature of 15° to 35° C. in a solid concentration of 3 to 25% by weight under an applied voltage of 30 to 350 volt. An article to be electrocoated may be formed from metal, such as iron, copper, aluminum, zinc or an alloy thereof; or an electroconductive organic material. The electrocoated film may be cured at a temperature of 120° to 220° C. for 10 to 40 minutes.

A curing mechanism of the present invention is not known, but it is believed that the cyclic urea group (1) is ring-opened by heating as shown in the following formula

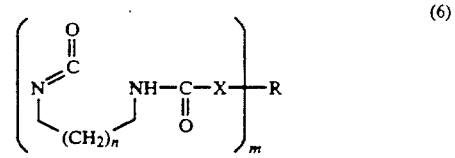

(6)

to produce an isocyanate group which effects crosslinking reactions. The ring-opening reaction produces no low molecular materials and obviates the problems (e.g. heat loss and distortion of coating) which are associated with conventional blocked polyisocyanate compounds. Also, since the component of the present invention has a group X having a high polarity, the obtained aqueous composition is easily prepared and very stable.

EXAMPLES

The present invention is illustrated by the following examples which, however, are not to be construed as limiting the present invention to their details.

PRODUCTION EXAMPLE 1

Aminated polybutadiene

An epoxidized polybutadiene having an oxirane oxygen atom of 6.4% was prepared by epoxidizing polybutadiene having a number average molecular weight of 2,000 and 1,2-bond of 65% (available from Nippon Petrochemicals Co. Ltd. as Nisseki Polybutadiene B-2000) with peracetate.

Next, 1,000 g of the epoxidized polybutadiene and 354 g of ethylene glycol monoethyl ether were charged in a 2 liter autoclave and 62.1 g of dimethylamine was added to react at 150° C. for 5 hours. Unreacted dimethylamine was removed by distillation to obtain an aminated polybutadiene. The aminated polybutadiene had an amine value of 120 mmol/100 g (solid content) and a nonvolatile content of 75%.

PRODUCTION EXAMPLE 2

Aminated epoxy resin A

A suitable reaction vessel was charged with 970 g of an epoxy resin having an epoxy equivalent of 485 (available from Shell Company as Epicoat 1001) and 265 g of polycaprolactone diol (available from Union Carbide Corporation as PCP 0200), and heated to 100° C. in a nitrogen atmosphere and then 0.46 g of dimethylbenzylamine was added. The reaction mixture was heated to 130° C. at which it was allowed to stand for one and half hours. After cooling to 110° C., 110 g of methyl isobutyl ketone and 39.8 g of methylisobutyldiketimine prepared from diethylenetriamine were added and then 100 g of methyl isobutyl ketone was added. After cooling to 70° C., 53.1 g of diethylamine was added thereto and kept at 120° C. for 3 hours to form the aminated epoxy resin A.

PRODUCTION EXAMPLE 3

Aminated epoxy resin B

A suitable reaction vessel was charged with 970 g of an epoxy resin having an epoxy equivalent of 485 (available from Shell Company as Epicoat 1001) and 265 g of polycaprolactone diol (available from Union Carbide Corporation as PCP 0200), and heated to 100° C. in a nitrogen atmosphere and then 0.46 g of dimethylbenzylamine was added. The reaction mixture was heated to 130° C. at which it was allowed to stand for one and half hours. After cooling to 110° C., 110 g of methyl isobutyl ketone and 21.0 g of diethanolamine were added and then 100 g of methyl isobutyl ketone was added. After cooling to 70° C., 53.1 g of diethylamine was added thereto and kept at 120° C. for 3 hours to form the aminated epoxy resin A.

PRODUCTION EXAMPLE 4

Epoxy ester compound

| Ingredient | Parts by weight (g) |
| --- | --- |
| Epicoat 1004* | 1000 |
| Ethylene glycol monoethyl ether | 343 |
| Hydroquinone | 10 |
| Acrylic acid | 76.3 |
| N,N-dimethylaminoethanol | 5 |

*A bisphenol type epoxy resin having an epoxy equivalent of 950 commercially available from Shell Company.

Epicoat 1004 was dissolved in ethylene glycol monoethyl ether. Acrylic acid, hydroquinone and N,N-dimethylaminoethanol were then added and heated to 100° C. at which the reaction was carried out for 5 hours to obtain a resin solution having an acid value of 2 mmol/100 g and a solid content of 75% by weight.

PRODUCTION EXAMPLE 5

Polyfunctional carbonylpropyleneurea compound A

One hundred gram (450 mmol) of phenoxycarbonylpropyleneurea and 59 g (450 mmol) of hydroxyehtyl methacrylate were dissolved in 900 ml of dioxane at 85° to 90° C. Then, 400 mg of dibutyltin dilaurate was added thereto and allowed to mix for 13 hours with heat. After completion of the reaction, the mixture was concentrated and recrystalized with ether to obtain 90 g of 2-methacryloyloxyethyloxycarbonylpropyleneurea (77.5% yield).

Next, 50 g of the reaction product and 150 g of 2-ethylhexyl acrylate were dissolved in 400 g of dioxane at 80° to 85° C., to which a solution containing 4.8 g of azobisisobutylonitrile and 200 g of dioxane was added dropwise for one and half hours. The reaction mixture was allowed to stand for 2 hours to obtain a title compound having a molecular weight of 2,670.

PRODUCTION EXAMPLE 6

Polyfunctional carbonylpropyleneurea compound B

One hundred fifty gram of the reaction product of Production Example 5 and 50 g of 2-ethylhexyl acrylate were dissolved in 400 g of dioxane at 80° to 85° C.; and a solution containing 4.8 g of azobisisobutylonitrile and 200 g of dioxane was added dropwise for one and half hours. The reaction mixture was allowed to stand for 2 hours to obtain a title compound having a molecular weight of 9,820.

PRODUCTION EXAMPLE 7

Polyfunctional carbonylpropyleneurea compound C

One hundred gram of the reaction product of Production Example 5, 50 g of N,N-dimethylaminopropyl methacrylamide and 50 g of 2-hydroxyl ethyl methacrylate were dissolved in 400 g of dioxane at 80° to 85° C., and a solution containing 4.8 g of azobisisobutylonitrile and 200 g of dioxane was added dropwise for one and half hours. The reaction mixture was allowed to stand for 6 hours to obtain a title compound having a molecular weight of 4,600.

PRODUCTION EXAMPLE 8

Polyfunctional carbonylpropyleneurea compound D

Two hundred gram of the reaction product of Production Example 5 was dissolved in 400 g of dioxane at 80° to 85° C., and a solution containing 4.8 g of azobisisobutylonitrile and 200 g of dioxane was added dropwise for one and half hours. The reaction mixture was allowed to stand for 6 hours to obtain a title compound having a molecular weight of 2,400.

PRODUCTION EXAMPLE 9

Polyfunctional carbonylpropyleneurea compound E

One hundred and seven gram of 1,6-hexane diol and 400 g of phenoxycarbonylpropyleneurea were dissolved in 3 liter of dioxane, to which 10 g of dibutyltin dilaurate was added. The mixture was mixed for 8 hours at 85° C. After the completion of the reaction, it was condensed, rinsed and purified to obtain 304 g of 1,6-hexamethylene-di-(oxycarbonylpropyleneurea) (83% yield).

The product has;
Melting point 74° to 77° C.
NMR; 6.71 (b,s), 4.21 (t), 3.75 (m), 3.32 (d,t), 1.88–1.47 (m).

PRODUCTION EXAMPLE 10

Polyfunctional carbonylpropyleneurea compound F

Diglycidyl ether of bisphenol A (molecular weight=340, epoxy value=170) of 340 g was dissolved in 950 g of dioxane and heated, to which 210 g of diethanolamine was added dropwise. After mixing for 2 hours, a solution containing 770 g of phenoxycarbonylpropyleneurea and 1,000 g of dioxane was added thereto and 13.2 g of dibutyltin dilaurate was then added and mixed at 80° C. for 12 hours. Next, 2.6 g of dibutyltin dilaurate was added and mixed at 95° C. for 30 hours. After the completion of the reaction, the mixture was condensed, rinsed and purified to obtain 625 g of the title material (70% yield).

PRODUCTION EXAMPLE 11

Polyfunctional carbonylpropyleneurea compound G

Eighty nine gram of phenoxycarbonylpropylenurea and 24 g of hexamethylenediamine were dissolved in 200 g of dioxane with heat. After one hour, termination of the reaction was identified by thin layer chromatography. It was condensed and rinsed to obtain 70.5 g of the desired compound (94% yield).

The product has;
Melting point; 196° to 198° C.
NMR; 9.23, 3.26 (m), 5.42, 1.92 (t,t), 3.83 (t), 1.54 (m), 3.33 (d,t), 1.35 (m).

PRODUCTION EXAMPLE 12

Polyfunctional carbonylpropyleneurea compound H

One hundred gram of 3-amino-1-propanol and 586 g of phenoxycarbonylpropyleneurea were added to 5 liter of dioxane, followed by addition of 1 g of dibutyltin lauratre, and mixed at 80° C. for 5 hours. The crude product was condensed and rinsed to obtain the desired compound of 217 g (yield 50%).

PRODUCTION EXAMPLE 13

Preparation of blocked polyisocyanate

To 291 g of a 80/20 (weight ratio) mixture of 2,4/2,6-toluene diisocyanate was added 218 g of 2-ethylhexanol with stirring at 38° C. in a dried nitrogen atmosphere. It was kept at 38° C. for 30 minutes and then heated to 60° C. at which 75 g of trimethylolpropane and 80 mg of dibutyltin dilaurate were added thereto. The mixture was kept at 120 for about one and half hours until IR spectrum showed that all isocyanate groups were consumed. The reaction mixture was diluted with 249 g of ethyleneglycol mono butyl ether and 1,500 g of dioxane to obtain the blocked polyisocyanate compound.

EXAMPLE 1

A mixture was prepared by mixing 200 parts by weight of the aminated polybutadiene of Production Example 1, 200 parts by weight of the epoxy ester of Production Example 4 and 400 parts by weight of the polyfunctional carbonylpropyleneurea compound A of Production Example 5, and neutralized with 5 g of acetic acid. Then, deionized water was added slowly to adjust to a solid content of 20% by weight.

Next, 2,000 g of the above obtained solution, 4 g of carbon black, 20 g of basic lead silicate and 2,000 g of glass beads were charged in a 5 liter stainless beaker, and vigorously mixed by a high speed mixer for two hours, followed by filtering the glass beads out. Deionized water and 0.32 g of manganese acetate were added to form an electrocoating paint having a solid content of 16.5% by weight.

An electrocoating bath was prepared from the electrocoating paint, and then a zinc phosphated steel panel was dipped in the bath as a cathode. Electrocoating was conducted at 30° C. and an applied voltage of 120 V for 3 minutes, and then baked at 200° C. for 25 minutes. The obtained coating was evaluated for heat loss, remaining internal stress and surface roughness. The results are shown in Table 1.

EXAMPLE 2

A mixture was prepared by mixing 400 parts by weight of the aminated epoxy resin of Production Example 3 and 400 parts by weight of the polyfunctional carbonylpropyleneurea compound B of Production Example 6, and neutralized with 6.6 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 3

A mixture was prepared by mixing 200 parts by weight of the aminated polybutadiene of Production Example 3, 200 parts by weight of the epoxy ester of Production Example 3 and 30 parts by weight of the polyfunctional carbonylpropyleneurea compound C of Production Example 6, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 4

A mixture was prepared by mixing 200 parts by weight of the aminated polybutadiene of Production Example 1, 200 parts by weight of the epoxy ester of Production Example 4 and 50 parts by weight of the polyfunctional carbonylpropyleneurea compound F of Production Example 10, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 5

A mixture was prepared by mixing 400 parts by weight of the aminated epoxy resin of Production Example 3 and 150 parts by weight of the polyfunctional carbonylpropyleneurea compound F of Production Example 10, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 6

A mixture was prepared by mixing 400 parts by weight of the aminated epoxy resin of Production Example 3 and 600 parts by weight of the polyfunctional carbonylpropyleneurea compound C of Production Example 7, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 7

A mixture was prepared by mixing 400 parts by weight of the aminated epoxy resin of Production Example 3 and 300 parts by weight of the polyfunctional carbonylpropyleneurea compound D of Production Example 8, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 8

A mixture was prepared by mixing 400 parts by weight of the aminated epoxy resin of Production Example 3 and 100 parts by weight of the polyfunctional carbonylpropyleneurea compound G of Production Example 11, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 9

A mixture was prepared by mixing 400 parts of weight of the aminated epoxy resin of Production Example 3 and 87 parts by weight of the polyfunctional carbonylpropyleneurea compound H of Production Example 12, and neutralized with 5 g of acetic acid. Then, deionized water was added slowly to adjust a solid content of 20% by weight.

The above obtained aqueous solution was employed and processed as generally described in Example 1 to form an electrocoating composition and a coated panel. The same evaluations were conducted and the results are shown in Table 1.

EXAMPLE 10

Eight hundred parts by weight of the polyfunctional carbonylpropyleneurea compound C of Production Example 7 was neutralized with 5.3 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

EXAMPLE 11

Eight hundred parts by weight of the polyfunctional carbonylpropyleneurea compound F of Production Example 10 was neutralized with 5.3 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

COMPARATIVE EXAMPLE 1

The same test was conducted as generally described in Example with the exception that 138 parts by weight of the blocked polyioscyanate compound of Production Example 13 was employed instead of the polyfunctional carbonylpropyleneurea compound A of Production Example 5. The same evaluations were conducted and the results are shown in Table 1.

COMPARATIVE EXAMPLE 2

A mixture was prepared by mixing 400 parts by weight of the aminated epoxy resin of Production Example 3 and 414 parts by weight of the blocked polyisocyanate of Production Example 13, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

COMPARATIVE EXAMPLE 3

A mixture was prepared by mixing 400 parts by weight of the aminated epoxy resin of Production Example 2 and 414 parts by weight of the blocked polyisocyanate of Production Example 13, and neutralized with 5 g of acetic acid. Then, deionized water was added slowly to adjust to a solid content of 20% by weight.

The above obtained aqueous solution was employed and processed as generally described in Example 1 to form an electrocoating composition and then a coated panel. The same evaluations were conducted and the results are shown in Table 1.

TABLE 1

|  | Heat loss (%) | Remaining internal stress (kgmm²) | Surface roughness |
|---|---|---|---|
| Example 1 | 2.8 | 5.9 | 0.19 |
| 2 | 3.6 | 6.2 | 0.23 |
| 3 | 3.0 | 5.6 | 0.22 |
| 4 | 3.0 | 5.9 | 0.26 |
| 5 | 3.1 | 6.0 | — |
| 6 | 3.3 | 6.4 | — |
| 7 | 2.9 | 5.2 | — |
| 8 | 3.2 | 6.0 | — |
| 9 | 3.4 | 6.8 | — |
| 10 | 2.8 | 5.9 | — |
| 11 | 3.6 | 6.7 | — |
| Comp. Ex. 1 | 8.4 | 9.6 | 0.44 |
| 2 | 13.6 | 12.4 | 0.73 |
| 3 | 14.2 | 13.2 | — |

EXAMPLE 12

A mixture was prepared by mixing 400 parts by weight of the aminated epoxy resin of Production Example 3 and 400 parts by weight of the polyfunctional carbonylpropyleneurea compound B of Production Example 6, and neutralized with 6.6 g of acetic acid. Then, deionized water was added slowly to adjust to a solid content of 40% by weight.

A zinc phosphated steel panel was dipped in the above obtained solution, and dried under a reduced pressure at 50° C. for 30 minutes. The coated panel was baked at 200° C. for 25 minutes to form a cured film. The cured film was evaluated for heat loss and the results are shown in Table 2.

EXAMPLE 13

A mixture was prepared by mixing 400 parts by weight of the aminated epoxy resin of Production Example 3 and 150 parts by weight of the polyfunctional carbonylpropyleneurea compound F of Production Example 10, and neutralized with 5 g of acetic acid. Then, deionized water was added slowly to adjust to a solid content of 40% by weight.

A zinc phosphated steel panel was dipped in the above obtained solution, and dried under a reduced pressure at 50° C. for 30 minutes. The coated panel was baked at 200° C. for 25 minutes to form a cured film. The cured film was evaluated for heat loss and the results are shown in Table 2.

EXAMPLE 14

Eight hundred parts by weight of the polyfunctional carbonylpropyleneurea compound C of Production Example 7 was neutralized with 5.3 g of acetic acid. Then, deionized water was added slowly to adjust to a solid content of 40% by weight.

A zinc phosphated steel panel was dipped in the above obtained solution, and dried under a reduced pressure at 50° C. for 30 minutes. The coated panel was baked at 200° C. for 25 minutes to form a cured film. The cured film was evaluated for heat loss and the results are shown in Table 2.

COMPARATIVE EXAMPLE 4

A mixture was prepared by mixing 400 parts by weight of the aminated epoxy resin of Production Example 3 and 414 parts by weight of the blocked polyisocyanate of Production Example 13, and neutralized with 5 g of acetic acid. Then, deionized water was added slowly to adjust to a solid content of 40% by weight.

A zinc phosphated steel panel was dipped in the above obtained solution, and dried under a reduced pressure at 50° C. for 30 minutes. The coated panel was baked at 200° C. for 25 minutes to form a cured film. The cured film was evaluated for heat loss and the results are shown in Table 2.

TABLE 2

|  | Heat loss (%) |
|---|---|
| Example 12 | 3.7 |
| 13 | 3.4 |
| 14 | 3.0 |
| Comp. Ex. 4 | 15.0 |

What is claimed is:

1. An aqueous composition comprising:
   a) a compound having in one molecule of molecular weight of up to 100,000 3-50 carbonylcyclic urea groups represented by the following formula (1)

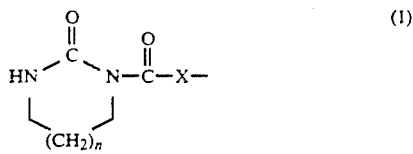

wherein n is an integer of 0 to 5, and X which may be the same or different, represents an oxygen atom, a sulfur atom or $-NR_1-$ in which $R_1$ is a hydrogen atom, an alkyl, hydroxyalkyl or alkylene group having 1 to 5 carbon atoms; and
   b) a resin which has a functional group reactive with an isocyanate group and is water soluble or water dispersible by way of neutralizing.

2. The aqueous composition according to claim 1 wherein said X in the formula (1) is an oxygen atom.

3. The aqueous composition according to claim 1 being electrodepositable onto a cathode.

4. An aqueous composition comprising a resin (c) which has a functional group reactive with an isocyanate group and has in one molecule at least two carbonylcyclic urea groups represented by the following formula (1)

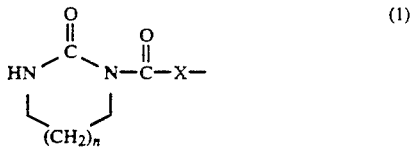

[wherein n and X are the same as mentioned above] and which is water soluble or water dispersible by way of neutralizing.

5. The aqueous composition according to claim 4 wherein said resin (c) has 3 to 50 carbonylcyclic urea groups and a molecular weight of up to 100,000.

6. The aqueous composition according to claim 4 wherein said X in the formula (1) is an oxygen atom.

7. The aqueous composition according to claim 4 being electrodepositable onto a cathode.

* * * * *